United States Patent
Wu et al.

(10) Patent No.: US 9,540,734 B2
(45) Date of Patent: Jan. 10, 2017

(54) CONDUCTIVE COMPOSITIONS COMPRISING METAL CARBOXYLATES

(71) Applicant: XEROX CORPORATION, Norwalk, CT (US)

(72) Inventors: Yiliang Wu, Oakville (CA); Ping Liu, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 199 days.

(21) Appl. No.: 14/079,533

(22) Filed: Nov. 13, 2013

(65) Prior Publication Data

US 2015/0132476 A1   May 14, 2015

(51) Int. Cl.
  C23C 18/08   (2006.01)
  C09D 11/52   (2014.01)
  C23C 18/14   (2006.01)

(52) U.S. Cl.
  CPC .............. *C23C 18/08* (2013.01); *C09D 11/52* (2013.01); *C23C 18/14* (2013.01)

(58) Field of Classification Search
  CPC ......... C09D 11/36; C09D 11/52; C23C 18/08; C23C 18/14
  USPC ........................................................ 252/500
  See application file for complete search history.

(56) References Cited

U.S. PATENT DOCUMENTS

| 4,723,024 | A | 2/1988 | DePompei |
|---|---|---|---|
| 8,057,849 | B2 | 11/2011 | Liu et al. |
| 8,158,032 | B2 | 4/2012 | Liu et al. |
| 8,298,314 | B2 | 10/2012 | Li |
| 8,324,294 | B2 | 12/2012 | Wu et al. |
| 8,361,350 | B2 | 1/2013 | Wu et al. |
| 2009/0090273 | A1* | 4/2009 | Heo ........ C09D 11/52 106/31.92 |
| 2011/0315436 | A1* | 12/2011 | Kim ...... B22F 1/0018 174/257 |
| 2013/0277096 | A1* | 10/2013 | Seong .... C09D 11/52 174/257 |
| 2014/0000942 | A1* | 1/2014 | Seong .... B41M 3/006 174/253 |
| 2014/0342083 | A1 | 11/2014 | Wu |

FOREIGN PATENT DOCUMENTS

CN   103045003 A  *  4/2013

OTHER PUBLICATIONS

Wu, et al., U.S. Appl. No. 13/894,495.

* cited by examiner

*Primary Examiner* — Mark Kopec
*Assistant Examiner* — Danny N Kang
(74) *Attorney, Agent, or Firm* — Pillsbury Winthrop Shaw Pittman LLP

(57) ABSTRACT

A conductive composition that comprises a branched metal carboxylate and one or more solvents. The solvents may be an aromatic hydrocarbon solvent. In embodiments, the branched metal carboxylate is a silver carboxylate. The conductive composition may be used in forming conductive features on a substrate, including by inkjet printing, screen printing or offset printing.

16 Claims, 2 Drawing Sheets

| INK ID | SAMPLE INK 1 | SAMPLE INK 2 | SAMPLE INK 3 |
|---|---|---|---|
| SOLVENT | TRIMETHYLBENZENE: DECALIN (2:1) | TRIMETHYLBENZENE: DECALIN (1:1) | TRIMETHYLBENZENE: TERPINEOL (2:1) |
| VISCOSITY (cps) | 4.3 | 6.8 | 7.3 |
| SILVER CONTENT (wt%) | 15.5 | 15.9 | 15.7 |
| LINE WIDTH (um) | 50 | 55 | 55 |
| THICKNESS (nm) | 97 | 97 | 94 |
| CONDUCTIVITY (S/cm) | $1.08 \times 10^5$ | $0.82 \times 10^5$ | $1.09 \times 10^5$ |
| LINE IMAGE | | | |

US 9,540,734 B2

CONDUCTIVE COMPOSITIONS COMPRISING METAL CARBOXYLATES

BACKGROUND

Disclosed herein, in various embodiments, are stable, high performing conductive compositions suitable for printing, such as by inkjet, aerosol jet, gravure, and flexography printing. In particular, there is provided a conductive ink formulation comprising silver carboxylates which has optimal performance, such as, tunable viscosity for various printing technologies, substantially particle free composition to prevent inkjet nozzle clogging, lower annealing temperatures and improved stability.

Fabrication of electronic circuit elements using liquid deposition techniques is of profound interest as such techniques provide potentially low-cost alternatives to conventional mainstream amorphous silicon technologies for electronic applications such as thin film transistors (TFTs), light-emitting diodes (LEDs), RFID tags, photovoltaics, sensors, and the like. However the deposition and/or patterning of functional electrodes, pixel pads, and conductive traces, lines and tracks which meet the conductivity, processing, and cost requirements for practical applications have been a great challenge. Moreover, it is anticipated that printed electronics will involve multiple printing technologies which have different viscosity requirements, ranging from about a few cps for ink jetting to about 50,000 cps for screen printing. A conductive ink composition with tunable viscosity is therefore desired.

Solution processable or printable silver-based conducting materials have attracted attention for printed electronic applications. In this regard, fabrication of electronic circuit elements using silver nanoparticle ink compositions is known. Silver nanoparticle ink compositions are described in, for example, U.S. Pat. Nos. 8,361,350, 8,324,294, 8,298,314, 8,158,032, and 8,057,849, each incorporated herein by reference in its entirety.

The use of silver nanoparticle ink compositions may have some drawbacks, for example such as consistency in nanoparticle size and quality, which may negatively impact the formation of consistent and reliable conductive features and stability of the ink composition. Silver nanoparticle ink compositions can also be expensive to prepare and use.

Besides silver metal nanoparticles, another type of silver-based conductive material, silver-organic compounds, may offer several benefits such as lower-cost, better stability, and ease of preparation, when compared to silver nanoparticles with respect to use in conductive ink compositions. For example, silver carboxylates, such as silver neodecanoate, are low-cost, very stable silver salts that may be used to print conductive traces at a low processing temperature.

However, silver carboxylates such as silver neodecanoate have previously been synthesized in a two-step process, which involved expensive starting materials and required a large amount of water/methanol to remove sodium salt impurity. For example, silver carboxylate such as silver neodecanoate may be synthesized in a two-step process in which first, neodecanoic acid is reacted with an alkali base solution such as sodium hydroxide solution to form sodium neodecanoate in a water/alcohol mixture. The sodium neodecanoate then is reacted with silver nitrate to precipitate the silver neodecanoate salt, followed by washing with a large amount of water/methanol to remove the sodium salt. The drawbacks of this approach are clear: 1) expensive starting materials such as silver nitrate have to be used; and 2) a large amount of water/methanol is required to wash the product to remove the sodium salt impurity.

U.S. Pat. No. 4,723,024, incorporated herein by reference in its entirety, describes a method of preparing a silver salt of an organic acid comprising the steps of: (A) preparing a mixture of: (1) at least one organic carboxylic acid, (2) a hydrocarbon solvent, and (3) a mineral acid; and (B) adding a source of silver cation while maintaining the temperature of the resultant mixture at least at about 60° C. for a period of time sufficient to form the desired silver salt. The method described in this patent thus requires the use of a mineral acid and requires an elevated reaction temperature.

There remains a need for improved methods of making silver carboxylates, and conductive ink compositions comprised of silver carboxylates that have tunable viscosity for various printing methods and that are capable of forming high resolution traces having high conductivity, which methods are more economical than present methods.

SUMMARY

According to embodiments illustrated herein, there is provided novel conductive compositions comprising metal carboxylates. In particular, there is provided novel conductive compositions comprising silver carboxylates. In more specific embodiments, there is provided an inkjet ink comprising silver carboxylates.

In particular, the present embodiments provide a conductive composition comprising: a branched metal carboxylate; a first solvent being an aromatic hydrocarbon solvent in which the branched metal carboxylate is soluble; and a second solvent being an aliphatic solvent in which the branched metal carboxylate is soluble.

In further embodiments, there is provided a conductive composition comprising: a branched metal carboxylate; a first solvent being an aromatic hydrocarbon solvent in which the branched metal carboxylate is soluble; and a second solvent in which the branched metal carboxylate is soluble, wherein a composition at a near saturated concentration formed from the first solvent and the metal carboxylate has a low viscosity, and a composition at a near saturated concentration formed from the second solvent and the branched metal carboxylate has a high viscosity, and further wherein the conductive composition has a viscosity of from about 2 cps to about 3000 cps, which is tunable.

In further embodiments, there is provided a process for forming a conductive feature comprising: providing a conductive composition comprising a branched metal carboxylate, a first solvent being an aromatic hydrocarbon solvent in which the branched metal carboxylate is soluble, and a second solvent in which the branched metal carboxylate is soluble, wherein a composition at a saturated concentration formed from the first solvent and the metal carboxylate has a low viscosity, and a composition at a saturated concentration formed from the second solvent and the branched metal carboxylate has a high viscosity; liquid depositing the conductive composition onto a substrate; and annealing the conductive composition to the substrate to form the conductive feature. In particular, the metal carboxylate forms dimer, trimer, oligomer, or polymers in the second solvent.

BRIEF DESCRIPTION OF THE DRAWINGS

For a better understanding of the present embodiments, reference may be had to the accompanying figures.

DETAILED DESCRIPTION

Figure 1:
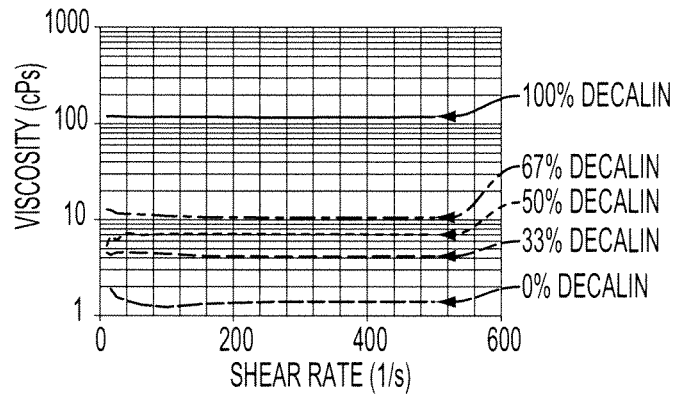
FIG. 1 is a graph showing viscosity of an ink composition with 40 wt % silver neodecanoate in a solvent mixture of trimethylbenzene and decalin, with the amount of decalin being varied from 0 to 100% of the total solvent by weight.

In the following description, it is understood that other embodiments may be utilized and structural and operational changes may be made without departure from the scope of the present embodiments disclosed herein.

Solvent ink technology broadens printing capability and customer base across many markets, and the diversity of printing applications will be facilitated by effective integration of printhead technology, print process and ink materials. As discussed above, while current ink options are successful for printing on various substrates, there is a need for more robust conductive compositions that can be used as inks, for example, for printing electronics applications.

Described herein is a conductive composition comprising metal carboxylate that may be used for printing. Thus, this composition may be used as an inkjet ink. In embodiments, the metal can be silver, gold, copper, nickel, palladium, platinum, and the like and mixtures thereof. In specific embodiments, the conductive composition is comprised of at a silver carboxylate, for example silver neodecanoate, in two or more solvents.

Metal Carboxylates

As stated above, the metal used herein can be any suitable metals, including silver. The following section, however, will focus on silver as the metal carboxylate. The silver carboxylates may be efficiently prepared by directly reacting a carboxylic acid with silver oxide in a solvent at room temperature, a method which is disclosed in U.S. patent application Ser. No. 13/894,495, now U.S. Pat. No. 9,198,288 to Yiliang Wu et al., which is hereby incorporated by reference in its entirety. This method has several advantages over prior methods discussed above: 1) the reaction mixture is free of alkali bases and free of mineral acids, and thus no impurity ions are retained in the silver carboxylate product; 2) a low-cost starting material, silver oxide, is used; 3) the method utilizes a single-step, mild reaction, which can reduce the overall processing cost and eliminate the need for washing or purification of the silver carboxylate product. The methods herein thus employ a reaction mixture that is desirably comprised of only the carboxylic acid component, silver oxide and one or more solvents. To the extent that other materials are desired to be included in the reaction mixture, the reaction mixture should still remain free of alkali bases and mineral acids.

As the solvent of the co-solvent reaction mixture, a solvent that can dissolve the silver carboxylate product at a high concentration is to be used. The concentration of the silver carboxylate in the solvent is desirably at least 10% by weight, or at least 20% by weight, or at least 30% by weight including at least 40% by weight. In a given reaction, substantially all of the silver carboxylate produced in the reaction should be dissolved in the solvent of the reaction mixture. This enables the reaction to proceed with a high conversion rate of the silver oxide into the silver carboxylate products. The solvent should also have good solubility with the carboxylic acid of the reaction mixture.

The carboxylic acid of the reaction mixture may be one or more carboxylic acids, and may be aliphatic, cycloaliphatic and aromatic monobasic and polybasic carboxylic acids. The carboxylic acid(s) may be linear or branched and have from 6 to 28 carbon atoms, such as from 8 to 20 carbon atoms, or from 6 to 18 carbon atoms, or from 8 to 16 carbon atoms. The use of carboxylic acids with fewer than 6 total carbon atoms may result in silver carboxylates that have solubility issues in the solvent, while the use of carboxylic acids with more than 28 total carbon atoms may result in too much organic material being present in the silver carboxylate, making it difficult to achieve high silver contents, and high conductivity.

Examples of suitable carboxylic acids for the reaction mixture include straight chain carboxylic acids such as octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoiC acid, nonadecanoic acid, icosanoic acid and the like, and branched chain carboxylic acids such as saturated iso- and anteiso-methyl-branched acid, Neo (having a terminal tertiary butyl group or with two iso-methyl groups) carboxylic acid, saturated/unsaturated mid-chain methyl-branched acid, isoprenoid carboxylic acid. Specific examples include 1-cyclohexene-1-carboxylic acid, 10-R-methyloctadecanoic acid, tuberculostearic acid, 7-methyl-7-hexadecenoic acid, 2-ethyl-hexanoic acid, neodecanoic acid, neopalmitic acid. In embodiments, a liquid carboxylic acid at room temperature is preferred.

The carboxylic acid may be present in the reaction mixture in an amount of, for example, from about 10% to about 60%, including from about 20% to about 60% or from about 30% to about 60% by weight of the reaction mixture. In embodiments, the carboxylic acid component is present in the reaction mixture in an amount that is substantially equimolar with the amount of silver oxide to be added to the reaction mixture. In other embodiments, the molar ratio of carboxylic acid component to the silver oxide in the reaction mixture is from about 1:1 to about 3:1, including from about 1:1 to about 2:1.

In embodiments, the co-solvent system comprises a first solvent being an aromatic hydrocarbon solvent, such as one of or a combination of toluene, xylene, trimethylbenzene such as 1,2,4-trimethylbenzene and 1,3,5-trimethylbenzene, ethyl benzene, diethylbenzene, tetrahydronaphthalene, methyl ethylbenzene, methylnaphthalene, propylbenzene, butylbenzene, methyl propylbenzene and cumene. A second solvent is an aliphatic solvent such as, for example, decalin, terpineol, cyclohexane, dodecane, heptane, tetradecane, decane, decene, Isopar G, Isopar M, and mixtures thereof.

The metal carboxylate and the first solvent form a low viscosity composition at the near saturated concentration at room temperature. Viscosity range can be for example from 0.9 to about 10 cps, including from 1.0 to about 5.0 cps at room temperature. The metal carboxylate and the second solvent form a high viscosity composition at a near saturated concentration at room temperature, viscosity range can be for example from about 80 cps to about 3000 cps including from about 500 to 3000 cps and 500 to about 1000 cps at room temperature. The term of "saturated concentration" is the concentration at which point a solute cannot dissolve in the solvent any more. Additional amount of solute will appear as a separate phase. The term of "near saturated concentration" is defined in the present embodiments as a concentration that is about 5 wt % less than the saturated concentration. For example, if the silver carboxylate has a saturated concentration of 45 wt % in a specific solvent, the near saturated concentration is therefore deemed to be 40 wt % in this specific solvent. As used herein, "room temperature" is defined as from about 23 to about 27° C. Without limiting to any theory, it is believed that the metal carboxylate exists in the forms of dimer, trimer, oligomer, or polymer in the second solvent, thus offering a high viscosity.

The two or more solvents may be present in the reaction mixture in a combined amount of, for example from about 30% to about 90%, including from about 30% to about 80% or from about 35% to about 70% by weight of the reaction mixture.

In embodiments, a weight ratio of the first solvent to second solvent may be in the range of from about 99:1 to about 1:99, or from about 95:5 to about 5:95, or from about 90:10 to about 10:90. The viscosity of the conductive composition may be tuned by adjusting the amount of the second aliphatic solvent in the reaction mixture.

The silver oxide may be present in the reaction mixture in an amount of, for example from about 2% to about 60%, including from about 5% to about 60% by weight of the reaction mixture.

It should be noted that the invented composition can be prepared by directly reacting silver oxide with the carboxylic acid in the two solvents, or prepared by dissolving pre-synthesized silver carboxylic into the two solvents.

In the method of making the silver carboxylate, the reaction mixture is first formed. In making the reaction mixture, the components of the reaction mixture may be added in any order. In embodiments, the carboxylic acid is added to the solvent, and the silver oxide is subsequently added to the solvent in an incremental manner. The term "incremental" or "incrementally" means that the silver oxide is added slowly over time into the reaction mixture at a substantially constant rate, so that the reaction mixture has a substantially low solid component. In embodiments, the solid component (the silver oxide) in the reaction mixture is less than 15% including less than 10%, or less than 5% by weight. The incremental addition and the total amount are controlled to ensure the formation of silver carboxylate compound and reduce the possibility of forming silver nanoparticles during the reaction.

The reaction is conducted at room temperature, for example a temperature of from about 23° C. to about 27° C., and it is thus not necessary to subject the reaction mixture to heating. The reaction mixture may optionally be subjected to stirring or other mixing action to assist in dissolution of the silver oxide in the solvent and to assist in driving the reaction.

In the reaction, the carboxylic acid directly reacts with the silver oxide, generating silver carboxylate and water. The generated water may be removed from the reaction product in any suitable manner. A solution of the silver carboxylate in the solvent is thus obtained. The solution may comprise from about 10% to about 60% by weight silver carboxylate, such as from about 20% to about 50% by weight silver carboxylate.

The obtained solution of silver carboxylate in the solvent may be used directly as obtained from the reaction as a conductive ink or other material for deposition. Alternatively, the silver carboxylate may be isolated from the solvent by precipitation using a non-solvent such as methanol, ethanol, propanol, acetone, acetonitrile, and the like, and the isolated silver carboxylate re-dissolved in a the two solvents to form the conductive composition or other material for deposition.

Conductive Composition

In embodiments, the silver carboxylate is silver neodecanoate. In further embodiments, the branched silver carboxylate comprises 6 to 18 carbon atoms. The silver carboxylate may be present in the conductive composition in an amount of from about 5 to about 70, or of from about 5 to about 50, or of from about 20 to about 50 weight percent by total weight of the conductive composition. The two or more solvents may be present in the conductive composition in a combined amount of from about 30% to about 90%, including from about 30% to about 80% or from about 35% to about 70% by weight of the total weight of the composition.

In particular embodiments, the two or more solvents include combinations such as a trimethylbenzene/terpineol mixture or trimethylbenzene/decalin mixture. As discussed above, the use of decalin or terpineol co-solvent facilitates the proper adjustment of viscosity for various printing technologies, such as low viscosity ink for inkjet printing, relatively high viscosity ink for gravure or flexography printing. Highly conductive and uniform lines are obtained from the present compositions when applied via inkjet printing. It was found that the addition of small amount of carboxylic acid, for example neodecanoic acid, could lower the sintering temperature and shorten the annealing time. Without being bound by any theory, it is believed that the acidic environment facilitates decomposition of the metal carboxylate and prevents oxidation of metals from ambient air. It was also found that the addition of a small amount of carboxylic acid could extend the shelf-life of the conductive composition. The formation of any silver oxide in the conductive composition will be re-dissolved in the form of silver carboxylate in the solvents. In embodiments, the conductive composition of the present embodiments has a sintering temperature of from about 100 to about 300° C., or of from about 100 to about 250° C., or of from about 120 to about 200° C. The annealing time for the conductive composition of the present embodiments is from about 1 to about 120 minutes, or of from about 5 to about 60 minutes, or of from about 5 to about 30 minutes. In embodiments, a carboxylic acid additive comprising from about 6-18 carbon atoms such as neodecanoic acid is present in an amount of from about 0.05 to about 5 wt %, or from about 0.1 to about 2 wt % of the total weight of the conductive composition.

The conductive composition may also include other ingredients, including adhesion promoters such as adhesive polymers, such as polyester, polyacrylate, polycarbonate, polyamide, polystyrene, and epoxy polymer.

The ink of the present embodiments comprises a specific mixture of ink vehicles or solvents which achieves the enhanced properties. For example, the mixed solvents provide tunable viscosities that range from about 1 to about 3,000 cps, or of from about 2 to about 1,500 cps, or of from about 2 to about 1,000 cps, at room temperature and from about 1 to about 1000 cps, or of from about 1 to about 500 cps, or of from about 2 to about 500 cps, at a jetting temperature (both inkjet and aerosol jetting) of from about 25 to about 95° C. This tunable viscosity provides a conductive composition that can be used as an inkjet ink with little or no clogging of the inkjet nozzles. The ink may also have a surface tension from about 25 to about 40 mN/m, including from about 25 to about 35 mN/m, or from about 28 to about 32 mN/m.

Use of Conductive Composition

The fabrication of conductive features, such as an electrically conductive element, from the silver carboxylate composition can be carried out by depositing the composition on a substrate using any suitable liquid deposition technique at any suitable time prior to or subsequent to the formation of other optional layer or layers on the substrate. Thus, liquid deposition of the composition on the substrate can occur either on a substrate or on a substrate already containing layered material, for example, a semiconductor layer and/or an insulating layer.

"Liquid deposition" refers to, for example, deposition of the composition using a liquid process such as printing or liquid coating, where the liquid is the silver carboxylate composition. The silver carboxylate composition may be referred to as an ink when it is used in an inkjet printer or similar printing device to be deposited on a substrate. Examples of liquid coating processes may include, for example, spin coating, blade coating, rod coating, dip coating, and the like. Examples of printing techniques may include, for example, lithography or offset printing, gravure, flexography, screen printing, stencil printing, inkjet printing, stamping (such as microcontact printing), aerosol jet printing, and the like. Liquid deposition deposits a layer or line of the composition having a thickness ranging from about 5 nanometers to about 5 millimeters, such as from about 10 nanometers to about 1000 micrometers on the substrate. The deposited silver carboxylate composition at this stage may or may not exhibit appreciable electrical conductivity.

The substrate upon which the silver metal features are deposited may be any suitable substrate, including, for example, silicon, glass plate, plastic film, sheet, fabric, or paper. For structurally flexible devices, plastic substrates, such as for example polyester, polycarbonate, polyimide sheets and the like may be used. The thickness of the substrate may be from amount 10 micrometers to over 10 millimeters with an exemplary thickness being from about 50 micrometers to about 2 millimeters, especially for a flexible plastic substrate and from about 0.4 to about 10 millimeters for a rigid substrate such as glass or silicon.

Heating the deposited composition at a temperature of, for example, at or below about 250° C., such as, for example, from about 80° C. to about 200° C., from about 80° C. to about 180° C., from about 80° C. to about 160° C., from about 100° C. to about 140° C., "anneals" the composition to reduce the silver carboxylate and form an electrically conductive feature. Upon heating, the silver carboxylate undergoes a self-reduction to form silver nanoparticles, while the organic component is evaporated.

The heating temperature is one that does not cause adverse changes in the properties of previously deposited layer(s) or the substrate (whether single layer substrate or multilayer substrate). Also, the low heating temperatures described above allows the use of low cost plastic substrates, which have an annealing temperature below 200° C.

The heating can be performed for a time ranging from, for example, 0.01 second to about 10 hours and from about 10 seconds to 1 hour. The heating can be performed in air, in an inert atmosphere, for example, under nitrogen or argon, or in a reducing atmosphere, for example, under nitrogen containing from 1 to about 20 percent by volume hydrogen. The heating can also be performed under normal atmospheric pressure or at a reduced pressure of, for example, from about 1000 mbars to about 0.01 mbars.

As used herein, the term "heating" encompasses any technique(s) that can impart sufficient energy to the heated material or substrate to anneal the silver carboxylate. Examples of heating techniques may include thermal heating (for example, a hot plate, an oven, and a burner), infra-red ("IR") radiation, a laser beam, flash light, microwave radiation, or UV radiation, or a combination thereof.

Prior to heating, the layer of the deposited paste may be electrically insulating or with very low electrical conductivity, but heating results in an electrically conductive material.

The conductivity of the resulting element produced by heating the deposited silver carboxylate composition is, for example, more than about 100 Siemens/centimeter ("S/cm"), more than about 1000 S/cm, more than about 2,000 S/cm, more than about 5,000 S/cm, or more than about 10,000 S/cm or more than 50,000 S/cm. The resulting elements may be used as electrodes, conductive pads, interconnect, conductive lines, conductive tracks, and the like in electronic devices such as thin film transistors, organic light emitting diodes, RFID (radio frequency identification) tags, photovoltaic, displays, printed antenna and other electronic devices which require conductive elements or components.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Ink Formulation and Inkjet Printing

Silver neodecanoate was dissolved at 40 wt % in a solvent mixture to obtain an ink composition. Trimethylbenzene was used as the primary solvent, as the silver neodecanoate has an excellent solubility in it. Terpineol and decalin was used as the co-solvents to adjust viscosity of the formulation, and cohesion of the inks for good printability. FIG. 1 shows the viscosity of the ink formulations having different trimethylbenzene to decalin ratio. One can see that all formulations exhibited Newtonian behavior at a wide shear rate, which is very important for inkjet printing. The solution with trimethylbenzne only showed a low viscosity around 2 cps which is not suitable for inkjet printing. Upon adding decalin co-solvent, the viscosity can be manipulated or tuned from 2 to over 100 cps. When about 30 to about 70 wt % decalin was used in the solvent mixture, the composition exhibited suitable viscosity from about 4.3 to about 11 cps for inkjet printing.

Figure 2:
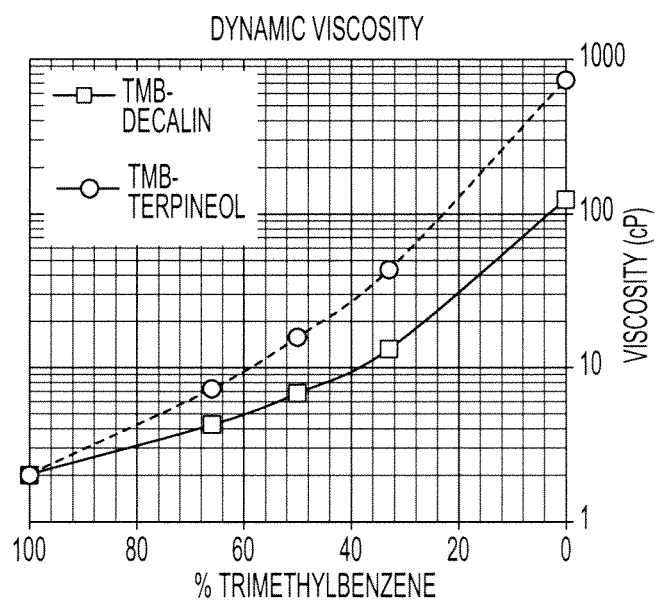
FIG. 2 is a graph showing viscosity of an ink composition as a function of solvent compositions.

The viscosity can also be adjusted by using terpineol as the co-solvent. Similarly, all composition showed Newtonian behavior at a wide shear rate. FIG. 2 shows the viscosity as a function of the solvent composition (Circle: trimethylbenzene-terpineol system; square: trimethylbenzene-decalin system.). One can see that the composition exhibited suitable viscosity for inkjet printing when about 30 to about 45 wt % terpineol was used in the solvent mixture. It should be noted that the viscosity of the composition can be controlled from 2 cps to 800 cps by using different solvents or solvent combinations. Although some high viscosity compositions cannot be used for inkjet printing, they may be suitable for other printing methods such as flexographic and gravure printings.

Figures 3, 4:
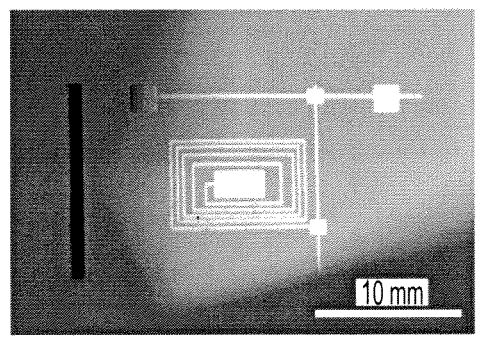
FIG. 3 is a table summarizing ink formulations and printing performance.
FIG. 4 is a photograph of a printed antenna image on Polyethylene terephthalate (PET) substrate.

Three ink compositions with viscosity from 4 to 10 cps were chosen for inkjet printing study. The ink composition contains 40 wt % silver neodecanoate, which resulted in about 15-16 wt % silver. The solvents and solvents ratio are summarized in FIG. 3. Printing study was carried out using DMP-2800 inkjet printing equipped with 10 pL cartridge. As shown in FIG. 3, the ink could form very nice droplets with straight tails. No residual ink on the faceplate of the print head. Fine lines were thereafter printed on glass substrates, following by thermal annealing at 160° C. for 20 min. At a drop spacing of 40 micrometers, a line width about 50-60 micrometers and thickness about 100 nanometers were observed. By measuring the resistance of the printed lines, conductivity was calculated to be around $1.0 \times 10^5$ S/cm, which is one of the highest values for solution processed conductors. Very straight lines with well-defined edges were obtained. The formulation with terpineol showed better line uniformity than the formulation with decalin. An antenna pattern was printed on PET substrate using the terpineol formulation. As shown in FIG. 4, the ink showed very good printing accuracy with no or few missing/misfired drops.

Example 2

Stabilizing the Solution and Lowering Sintering Temperature

Some of the above ink compositions showed yellow to orange brown color, particularly when stored at ambient conditions over time. The color may be due to the formation of silver nanoparticles or silver oxide nanoparticle during ink preparation and upon storage. To enhance the stability of the silver precursor composition, a small amount of neodecanoic acid (from about 0.1 to 2 wt % of the ink composition) was added during the ink preparation process. This small amount of carboxylic acid prevented the formation silver nanoparticles or silver oxide particle, resulting in very stable clear solution for over one month. Thus, one of the benefits of the present embodiments includes a longer shelf-life of the composition. To the inventors' surprise, when this composition was used to print or coat conductive layer, the silver precursor composition could be sintered at a lower temperature for a short time to achieve the same conductive level. For example, the composition with 1 wt % neodecanoic acid could be annealed at 130° C. for 10 min, while the composition without the acid required annealing at 160° C. for 20 min. Other carboxylic acids may be used as the additive in place of neodcanoic acid, including, an acid having 6 to 18 carbon atoms, branched or not branched.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A conductive composition comprising:
   a reaction mixture;
   a branched metal carboxylate present in an amount of from about 5 to about 70 percent by weight of the total weight of the conductive composition, wherein the metal for the branched metal carboxylate is selected from the group consisting of silver, palladium, copper, gold, nickel, or mixtures thereof;
   a first solvent being an aromatic hydrocarbon solvent in which the branched metal carboxylate is soluble, wherein the aromatic hydrocarbon solvent is selected from the group consisting of toluene, xylene, trimethylbenzene, ethyl benzene, diethylbenzene, methylethylbenzene, tetrahydronaphthalene, methylnaphthalene, propylbenzene, butylbenzene, methyl propylbenzene, cumene and mixtures thereof; and
   a second solvent being an aliphatic solvent in which the branched metal carboxylate is soluble;
   wherein the reaction mixture comprises the first solvent and the second solvent,
   wherein the conductive composition has a viscosity ranging from about 1 to about 3,000 cps at room temperature, and
   wherein the viscosity of the conductive composition is selected by controlling the amount of second solvent relative to the amount of first solvent in the reaction mixture.

2. The conductive composition of claim 1, wherein the branched silver carboxylate comprises 6 to 18 carbon atoms.

3. The conductive composition of claim 1, wherein the branched silver carboxylate is silver neodecanoate.

4. The conductive composition of claim 1, wherein aliphatic solvent is selected from the group consisting decalin, terpineol, cyclohexane, dodecane, tetradecane, heptane, decane, decene, Isopar G, Isopar M, and mixtures thereof.

5. The conductive composition of claim 1, wherein the first and second solvents are present in a combined amount of from about 5 to about 80 percent by weight of the total weight of the conductive composition.

6. The conductive composition of claim 1 being a jettable composition having a viscosity of from about 2 to about 1000 cps at a jetting temperature of from about 20 to about 95° C.

7. The conductive composition of claim 1 having a sintering temperature of from about 100 to about 250° C.

8. The conductive composition of claim 1 further including a carboxylic acid additive.

9. The conductive composition of claim 8, wherein the carboxylic acid additive comprises from about 6 to about 18 carbon atoms.

10. The conductive composition of claim 9, wherein the carboxylic acid additive is neodecanoic acid.

11. The conductive composition of claim 8, wherein the carboxylic acid additive is present in an amount of from about 0.05 to 5 wt % of the total weight of the conductive composition.

12. A conductive composition comprising:
- a branched metal carboxylate present in an amount of from about 5 to about 70 percent by weight of the total weight of the conductive composition;
- a first solvent being an aromatic hydrocarbon solvent in which the branched metal carboxylate is soluble; and
- a second solvent in which the branched metal carboxylate is soluble, wherein a composition at a near saturated concentration formed from the first solvent and the metal carboxylate has a low viscosity and a composition at a near saturated concentration formed from the second solvent and the branched metal carboxylate has a high viscosity, and further wherein the conductive composition has a viscosity of from about 2 cps to about 3000 cps at room temperature, and a surface tension from about 25 mN/m to about 40 mN/m.

13. The conductive composition of claim 12, wherein the composition at a near saturated concentration formed from the first solvent and the metal carboxylate has a viscosity of from about 0.9 to about 10 cps, and the composition at a near saturated concentration formed from the second solvent and the metal carboxylate has a viscosity of from about 80 to about 3,000 cps at room temperature.

14. The conductive composition of claim 12, wherein the branched metal carboxylate forms a dimer, trimer, oligomer, or polymer in the second solvent at a near saturated concentration.

15. A process for forming a conductive feature comprising:
- providing a conductive composition comprising
  - a branched metal carboxylate present in an amount of from about 20 to about 50 percent by weight of the total weight of the conductive composition,
  - a first solvent being an aromatic hydrocarbon solvent in which the branched metal carboxylate is soluble, and
  - a second solvent in which the branched metal carboxylate is soluble, wherein a composition at a near saturated concentration formed from the first solvent and the metal carboxylate has a low viscosity at room temperature, and a composition at a near saturated concentration formed from the second solvent and the branched metal carboxylate has a high viscosity at room temperature;
- liquid depositing the conductive composition onto a substrate; and
- annealing the conductive composition to the substrate to form the conductive feature.

16. The process of claim 15, wherein the liquid deposition is performed by a printing process selected from the group consisting of inkjet printing, aerosol jet printing, gravure printing, flexography printing, screen printing, offset printing, and mixtures thereof or by a non-printing process selected from the group consisting of spin coating, dip coating, bar coating, and mixtures thereof.

* * * * *